United States Patent [19]

Ma

[11] 4,162,824

[45] Jul. 31, 1979

[54] NONIMAGING RADIANT ENERGY COLLECTOR AND CONCENTRATOR

[76] Inventor: Horace Z. Ma, 1420 Farwood Dr., East Lansing, Mich. 48823

[21] Appl. No.: 920,786

[22] Filed: Jun. 30, 1978

[51] Int. Cl.² .............................................. G02B 5/10
[52] U.S. Cl. ..................................... 350/293; 350/320
[58] Field of Search ............... 350/292, 293, 296, 299, 350/320; 126/270, 271

[56] References Cited

U.S. PATENT DOCUMENTS

| | | | |
|---|---|---|---|
| 3,923,381 | 12/1975 | Winston | 350/293 |
| 4,003,638 | 1/1977 | Winston | 350/293 |

*Primary Examiner*—Jon W. Henry

*Attorney, Agent, or Firm*—Lowhurst & Aine

[57] ABSTRACT

A collector and concentrator of the nonimaging type for radiant energy, and particularly for solar energy, which includes a plurality of longitudinally-extending, generally trough-shaped channels having curved facing, reflective walls. The upper extremity of the channel defines an entrance aperture and the lower extremity defines an exit aperture. The walls are constructed of rectangular, flexible and deformable sheets or vanes attached along one edge to a longitudinal frame member having surfaces which are sloped to reflect a selected collector angle at the exit aperture and which are deformed by being urged against one another along the edge opposite to the attached edge. A radiant energy utilization means is disposed in the exit aperture.

19 Claims, 6 Drawing Figures

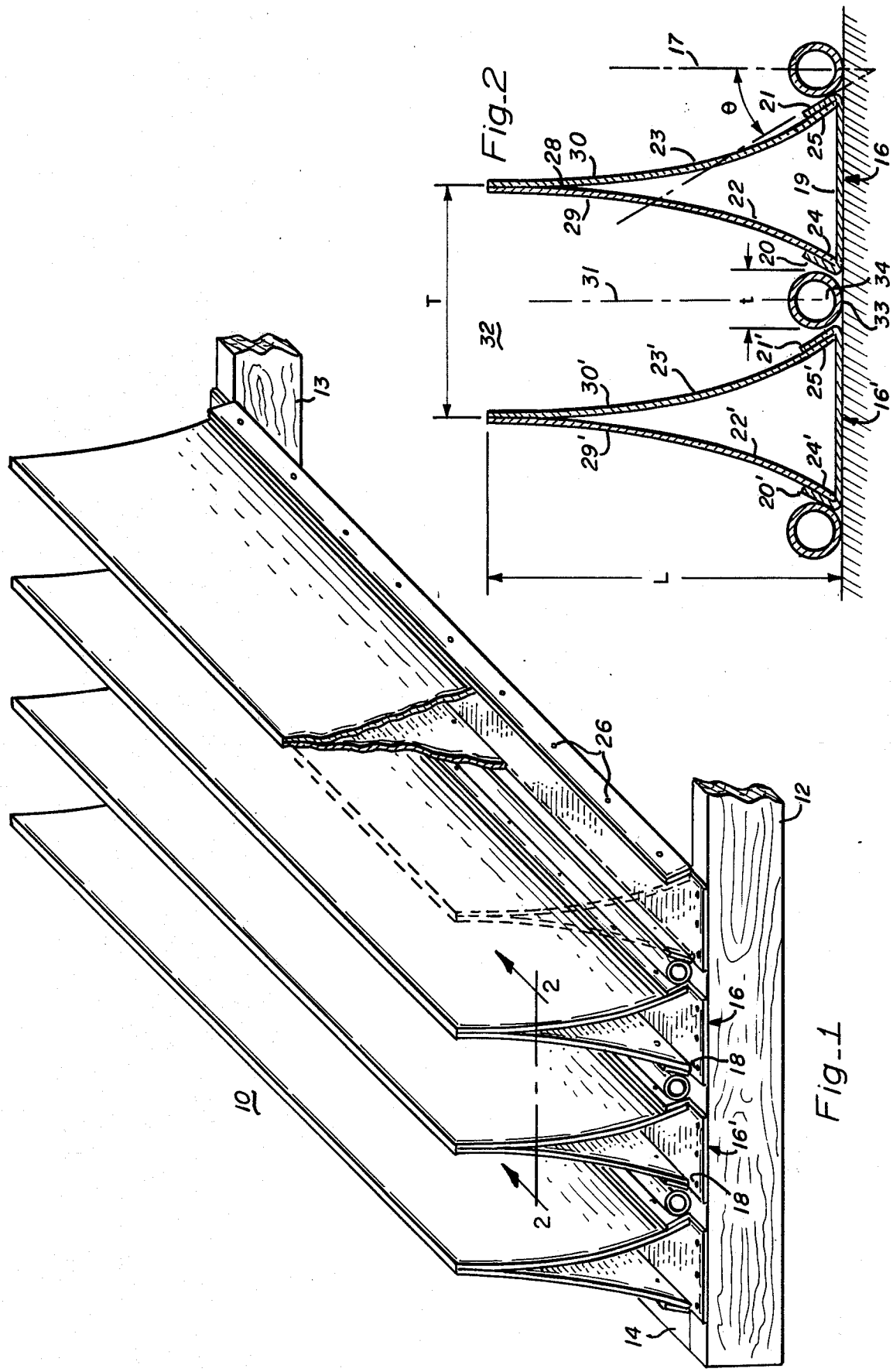

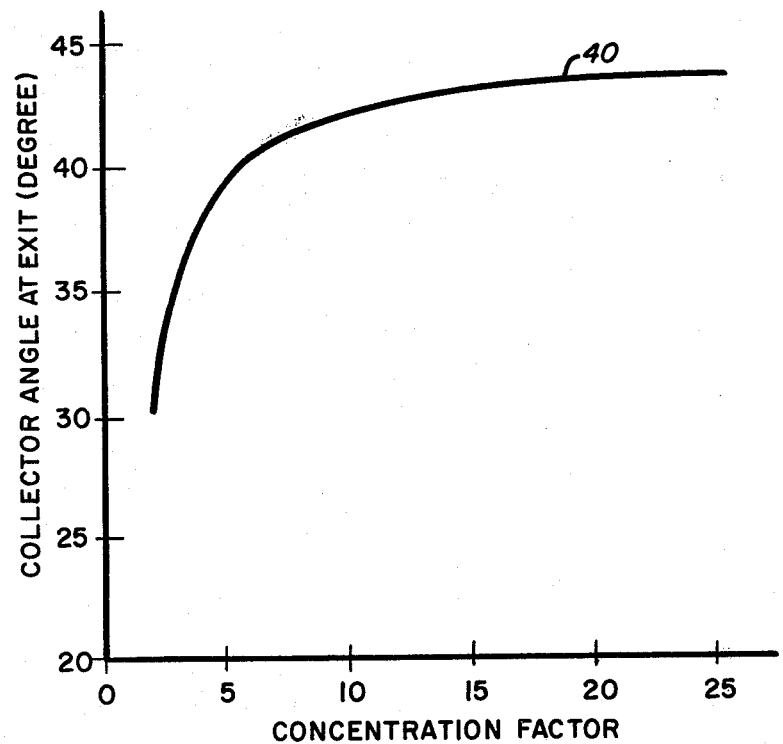
Fig_3
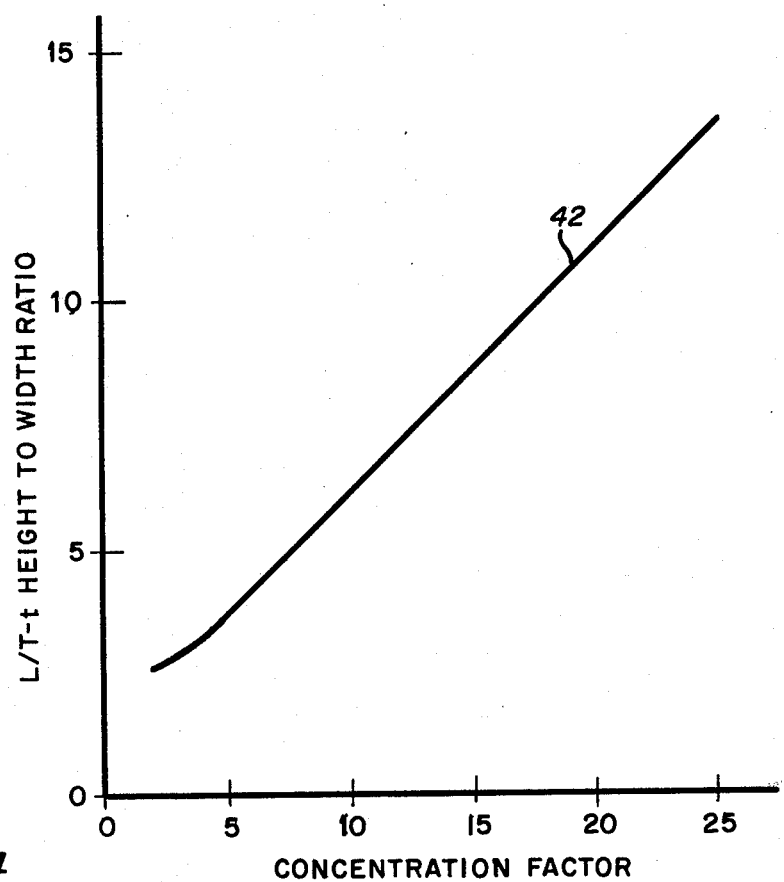
Fig_4

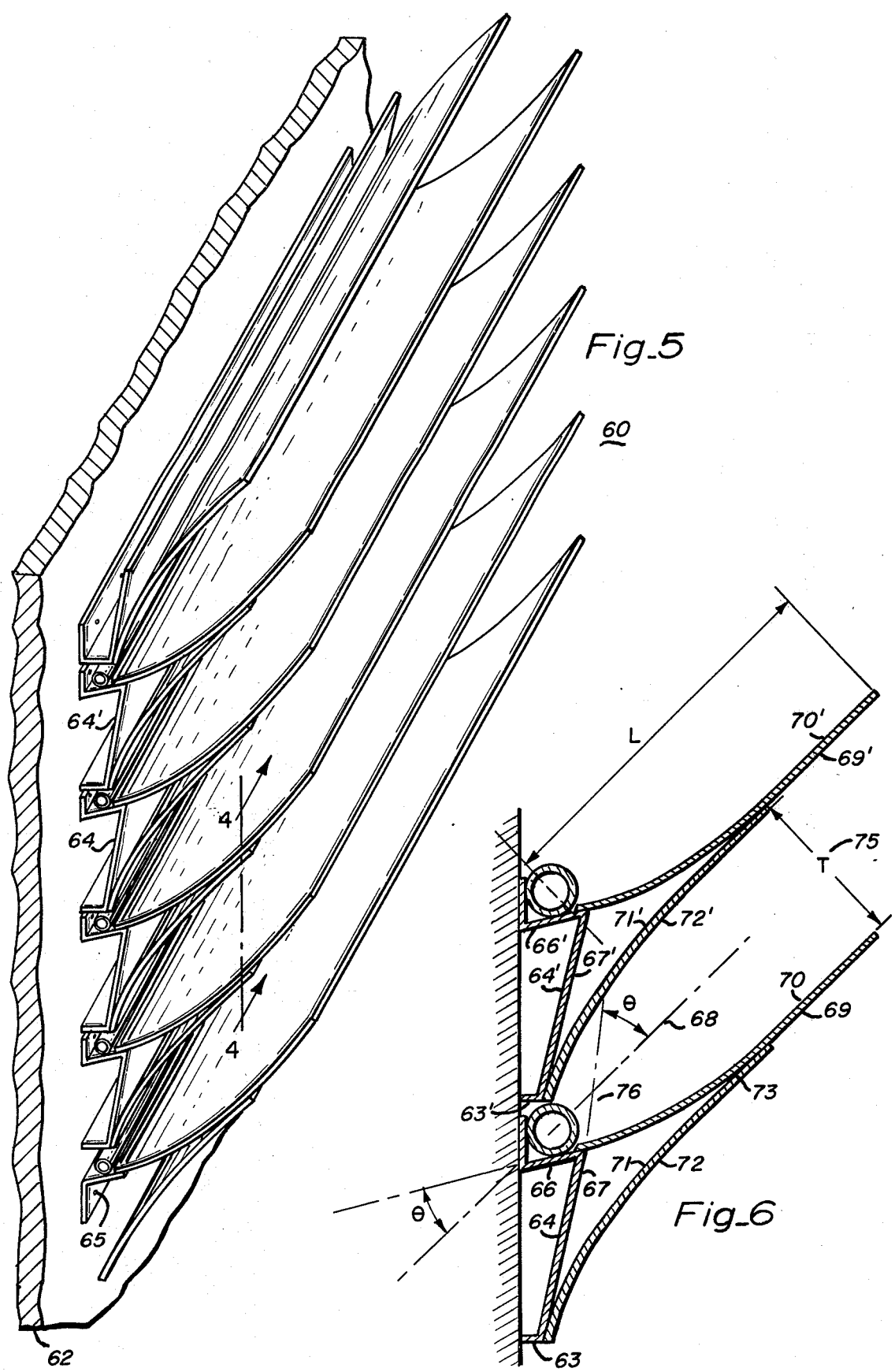

NONIMAGING RADIANT ENERGY COLLECTOR AND CONCENTRATOR

BACKGROUND OF THE INVENTION

The present invention relates generally to nonimaging radiant energy collectors and concentrators, and more particularly to an apparatus and a method for constructing a plurality of longitudinally extending, generally trough-shaped channels which approximate the ideal shape for such nonimaging concentrators. Pertinent art in connection with nonimaging concentrators include an article entitled "Principles of Cylindrical Concentrators for Solar Energy" by Winston and Hinterberger, published in Solar Energy, Vol. 17 pp. 255-258, Pergamon Press 1975, in which the authors describe the ideal cylindrical light collector or concentrator, and the necessary or required shape of the channel side walls for maximum concentration of the radiant energy entering the channel through an entrance aperture at the exit aperture. To the same effect, see also the U.S. Pat. Nos. 3,923,381 and 4,003,638 issued on Dec. 2, 1975 and Jan. 18, 1977, respectively, to Winston.

The ideal, nonimaging concentrator described in the above referenced article and patents (hereinafter also referred to as the Winston-type concentrator) has a pair of channel side walls which are precisely defined by mathematical expressions. To fabricate concentrators having such side walls is expensive because the specified side wall shape requires that the channel be cast or extruded, using a precise form, after which the side walls have to be machined and polished to provide the necessary facing reflective surfaces. Further, such castings or extrusions are usually thick to provide the necessary structural rigidity for an elongated channel, which further adds to the expense of fabrication and installation. Still further, the material from which these castings or extrusions are made must retain its reflectivity under constant exposure to the weather, which rules out many an inexpensive casting or extrusion material.

Since energy conservation, and particularly the utilization of solar energy as an alternate energy source, are most desirable at this time, and much effort is directed towards achieving this goal, it is surprising that the nonimaging radiant energy concentrator has not come into more common use. One of the explanations for the present lack of popularity of such concentrators is the cost factor, which, at this time, makes the expense of such concentrators substantially greater than that of solar panels which utilize, at least in the majority of instances, neither an imaging nor a nonimaging collector or concentrator structure.

SUMMARY OF THE PRESENT INVENTION

Accordingly, it is an object of the present invention to provide a nonimaging concentrator which simulates the Winston-type concentrator but which is more inexpensive in manufacture and installation even though it approximates its performance very closely.

It is a further object of the present invention to provide a concentrator for radiant energy which can be constructed on site and which still has a concentration efficiency which is substantially equal to that of the ideal concentrator.

It is still a further object of the present invention to provide a Winston-type concentrator which is economical to construct in that it utilizes sheet metal vanes and sheet metal construction techniques, and which has an efficiency which does not materially differ from the efficiency of an ideal or Winston-type concentrator.

In accordance with the present invention, a plurality of longitudinally extending, equidistantly spaced, frame members are mounted on a base member. Each frame member is provided with two surfaces which have a preselected slope or inclination with a plane of symmetry which bisects and is perpendicular to the entrance and exit aperture of a concentrator element. The elastic and deformable vanes each with one reflective surface have one end portion affixed to separately sloped or inclined surfaces of a frame member. The vanes affixed to a given frame member are thereby inclined at the resiliently urged collector angle towards one another and are pressed against one another along their surfaces opposite the reflective surface to elastically deform into a concave shape which approximates the shape of the channel wall of the Winston-type concentrator. The reflective surfaces of vanes attached to adjacent frame members form a concentrator element of trough-like shape.

DESCRIPTION OF THE DRAWINGS

FIG. 1 is a perspective view of a horizontally disposed radiant energy concentrator constructed in accordance with the present invention with portions of one channel cut away for illustrative purposes;

FIG. 2 is a cross-sectional view taken along line 2—2 of FIG. 1;

FIG. 3 is a graph showing the required collector angle $\theta$ at the exit aperture with respect to the symmetry plane of the concentrator channel as a function of the concentration factor;

FIG. 4 is a graph showing the ratio of the distance between the entrance and exit apertures of a concentrator channel to the difference between the widths of the apertures as a function of the concentration factor;

FIG. 5 is a perspective view of a vertically disposed radiant energy concentrator constructed in accordance with the present invention; and FIG. 6 is a cross-sectional view taken along line 4—4 of FIG. 5.

DETAILED DESCRIPTION OF THE EMBODIMENT

Referring now to FIGS. 1 and 2 of the drawings, there is shown a radiant energy collector 10 constructed in accordance with the present invention for mounting upon a horizontal base structure. The illustrated base structure comprises a pair of wooden beams 12 and 13 which are suitably supported and spaced apart a distance substantially equal to the length of the concentrator. For additional rigidity, a cross beam 14 may be connected to the ends of beams 12 and 13 and, in case of a large concentrator, additional support beams may be provided. The base structure for concentrator 10 may also comprise a deck or the roof or a side wall of a building or structure.

Mounted on the base structure are a plurality of longitudinal frame members such as 16, 16' which are fastened thereto by fastening means 18, 18' such as nails, bolts or the like. Frame member 16 can be fabricated of heavy gauge sheet metal or can be cast or extruded or welded. The frame member must be sufficiently rigid so that it will not deform under the stresses imposed upon it by the attached vanes, as will presently be described. Since it is exposed to the elements, its surface can be anodized or otherwise treated to resist corrosion due to exposure to the weather.

Referring now specifically to FIG. 2, frame member 16 includes a base portion 19 and a pair of side walls 20 and 21 which make, respectively, an angle $\theta$ with a line or plane 17 which is the line or plane of symmetry and which is perpendicular to and bisects the entrance and the exit apertures hereinafter defined. Angle $\theta$, as will also be described, is also referred to as the concentrator angle at the exit aperture and is enclosed by the side wall of the channel, which forms the trough-like concentrator, and the plane of symmetry at the exit aperture.

There are further provided a pair of substantially rectangular sheets or vanes 22' and 23' that have an attachment edge 24' and 25' along their lower extremity that is securely fastened to side walls 20' and 21', respectively. It should be understood that, even though the attachment edge of vane 22 is illustrated as being fastened to the interior surface of wall 20, it may just as well be fastened to the exterior surface of that side wall or it may be welded or otherwise affixed to base wall 19 to make the angle $\theta$ with symmetry plane 17. The means of attachment of vanes 22 and 23 to side walls 24 and 25 is not critical and may be done by fastening devices such as rivets or screws 26 or by welding or brasing, or by a combination thereof. The important point to keep in mind in connection with fastening vane 22 to frame member 16 is that the attachment must be such that the slope of vane 20, at the point or line of attachment, is equal to the collector angle $\theta$ at the exit aperture.

Vanes 22 and 23 are identical to one another in size and shape and are preferably rectangular, the length being selected to be equal to the desired length of the trough-like concentrator channel and the width being selected to provide the necessary separation "L" between the entrance and the exit apertures of the collector. The vanes are preferably made of stainless steel or aluminum sheets which have at least highly polished outer surfaces such as 29 and 30. Stainless steel is a preferred material because of its resilient, elastic, and noncorrosive qualities, and its durable reflective properties. Aluminum has very similar properties except that its elasticity, resilience and corrosion resistance are perhaps somewhat inferior to that of stainless steel.

After fastening one of the vanes to a side wall, say vane 22 to side wall 20, it is of course clear that the vane will extend parallel to the side wall to which it is fastened. In order to attach the other vane 23 to the opposing side wall 21, it is necessary to deform both side walls away from one another which will result in the vanes touching one another at 28 from which point they continue to extend parallel to form back-to-back concave surfaces or concave pairs. For elastic and resilient vanes, the shape these vanes assume when attached to the side walls as shown approximates the required curvature of the channel walls of an ideal concentrator to such an extent that the concentration factor and the efficiency of the ideal concentrator are substantially duplicated, providing each of the vanes is combined with a similar, reflective, facing vane.

Referring now again to FIG. 2, there is illustrated a frame member 16 on the right and a frame member 16' on the left, each being provided with a pair of vanes as has been explained heretofore. The longitudinal, trough-like channel 31 formed by vane 22 on the right and vane 23' on the left form an element or channel of the concentrator. Each concentrator element has an aperture 32 of width "T" at the top of the channel and an exit aperture 33 of width "t" at the bottom of the channel. Disposed in exit aperture 34 is radiant energy utilizing means 34, such as a pipe through which water flows, which is heated by radiant energy entering concentrator element 32 through the entrance aperture.

The concentration factor provided by concentrator element 32 is equal to the ratio of (T/t) and can vary anywhere from one to twenty-five or larger, depending on certain other factors which will now be discussed in connection with the description of FIGS. 3 and 4. Assuming that a concentrator element 32 is to be constructed to have a certain concentration factor, say 5, the collector angle at the exit aperture can be found from curve 40 which shows the collector angle as a function of the concentration factor. For a concentration factor of 5, the collector angle $\theta$ would be approximately 39°. Accordingly, side walls 20 and 21 would be constructed to have a collector angle $\theta$ of 39°.

Further, a selection of the distance between the apertures as well as the width of the apertures themselves can be made from curve 42 of FIG. 4 which shows the relationship between the ratio of aperture separation to the difference in aperture widths as a function of the concentration factor. Again, for a concentration of 5, the ratio of the aperture separation to the difference in aperture widths should be approximately 3.6. Since the exit aperture must have a minimum width to accommodate a radiant energy utilization means, such as the pipe of a certain diameter, this dimension is usually fixed. If we assume a pipe having an outside diameter of one inch, then for a concentration of 5 the entrance aperture must have a width of 5 inches and aperture separation L should be 14.4 inches.

It will also be noted that the spacing between adjacent frame members 16 will be substantially equal to the entrance aperture width T and that the width of the frame member, because of side wall separation, is equal to the difference between the width of the entrance and exit apertures T−t so that, in case of an entrance aperture of 5 inches and an exit aperture of 1 inch, the width of the frame member is 4 inches.

Referring now to FIGS. 5 and 6 of the drawing, there is shown an alternate embodiment of the radiant energy concentrator 60 which differs primarily with the one shown in FIG. 1 in that it is for mounting on a vertical base structure 62 rather than a horizontal base structure. As before, frame members 64 and 64' are mounted parallel to one another and are affixed to base structure 62 by suitable fastening means 65 such as rivets, bolts or the like. Base members 64 differ from base members 16 in several important respects, namely base member 64 has a pair of side walls 66 and 63 and a connecting wall or portion 67, each of which makes an angle $\theta$ with the center line 68 of the concentrator element to be formed. More particularly, a vane 69, having a reflective surface 70, is attached to side wall 66 and takes on the slope of side wall 66. Another vane 71 having a reflective surface 72 is attached to connecting portion 67 in such a manner that its starting slope is the same as the slope of wall 67. Both vanes 69 and 71 are again made of an elastic material as described before and are urged against one another and start touching at point 73 to thereby provide structural rigidity to the combination of the frame member and the two vanes. The same construction applies to frame member 64' and vane 69' with reflective surface 70' in combination with vane 71' with reflective surface 72' forming a trough-like channel 74 having center line 68 as the medium plane, the element being formed designated as concentrator element 74. As before, the angle θ as well as the width of the entrance aperture 75 and the exit aperture 76 being determined by reference to the graphs of FIGS. 3 and 4 as previously described.

The above described construction of a nonimaging concentrator is inexpensive and, even though the curve of the vane may not follow exactly the theoretical curve of the ideal concentrator, nevertheless approximation is sufficient to provide a highly efficient concentrator which can function as a solar energy collector. The concentrator can be mounted to the side or to the roof of a structure, can be extended simply by adding additional channels.

What is claimed is:

1. A nonimaging radiant energy collector comprising:
    a base member;
    a plurality of resiliently deformable, planar vanes having parallel upper and lower end portions, a back surface and a reflective front surface; and
    means for attaching said vanes to said base member in pairs, each pair including two vanes having facing back surfaces and separated lower end portions, the lower end portions being inclined towards one another to make the same preselected angle with a plane of symmetry and the upper and lower end portions of each vane being separated so that the upper end portions of a pair of vanes are urged against one another and deform the planar vanes into concave vanes.

2. A collector in accordance with claim 1 in which said pairs are arranged parallel to one another on said base member, and in which the channel defined by facing reflecting surfaces of adjacent pairs form an element of said collector.

3. A collector in accordance with claim 2 in which the separation between adjacent pairs is selected so that the upper end portion of facing reflective surfaces form an entrance aperture of a predetermined width.

4. A collector in accordance with claim 3 in which the separation between the lower end portion of a pair is selected so that the end portions of the facing reflective surfaces of adjacent pairs define an exit aperture of a predetermined width.

5. A collector in accordance with claim 4 in which the distance between the lower and the upper end portions of said vanes is selected to separate the entrance and the exit apertures a predetermined distance.

6. A nonimaging, radiant energy collector formed of a plurality of trough-like channels symmetric with respect to a plane of symmetry, each channel having an entrance aperture of width "T", an exit aperture of width "t", a collector angle θ at the exit aperture and an aperture separation "L", said collector comprising:
    a base member;
    a plurality of substantially identical, lengthwise extending frame members supported on said base member, said frame members being equidistantly spaced apart a preselected distance;
    a plurality of resiliently deformable vanes having parallel upper and lower end portions, a back surface, and a reflective front surface; and
    means for attaching two vanes each, along their lower end portions and with facing back surfaces, to a frame member such that the lower end portions are inclined towards one another and each make the same preselected collector angle with the plane of symmetry, the distance between the lower and upper end portions of each vane being such to cause the upper end portions to press against one another and deform the vanes into a concave pair of vanes, facing reflective surfaces of adjacent pairs of vanes forming said channels.

7. A collector in accordance with claim 6 in which said frame members include a pair of lengthwise extending, substantially planar attachment surfaces on opposite sides of the symmetry plane which are inclined towards one another and each make the said same preselected collector angle with the plane of symmetry, the vanes being fastened to said attachment surfaces.

8. A collector in accordance with claim 7 in which said frame member is formed of of at least three lengthwise extending planar walls and in which two of said three walls have surfaces which form said attachment surfaces.

9. A collector in accordance with claim 6 in which the lower end portions of a pair of vanes are separated a distance so that the resulting exit aperture of the appropriate channel has a width t, and in which adjacent frame members are separated a distance so that the resulting entrance aperture of the appropriate channel has a width T, and in which the said preselected collector angle is equal to θ, and in which the distance between the upper and the lower end portions of a vane is selected so that the entrance and exit apertures are separated a distance L.

10. A collector in accordance with claim 6 in which said vanes are substantially identical with the exception of the separation between the lower and the upper end portions, and the separation between the lower and the upper end portions being selected so that the upper end portions of a pair of vanes are contiguous.

11. The method of constructing a nonimaging, trough-like, radiant energy collector having an entrance aperture width "T", an exit aperture width "t", a collector angle "θ" at the exit aperture, and an aperture separation "L", said method comprising the step of:
    mounting a first flexible and deformable planar vane, having at least one reflective surface, to a base member on one side of and with the reflective surface facing a plane of symmetry, the lower end portion of said first vane being placed parallel to and being separated from said symmetry plane a distance substantially equal to ½t and said first vane being inclined at an angle "θ" with the symmetry plane;
    mounting a second vane, substantially identical to said first vane, to said base member on the other side of and with the reflective surface facing the symmetry plane, the lower end portion of said second vane being placed parallel to and being separated from said symmetry plane a distance substantially equal to ½t, said second vane being inclined at an angle of θ with the symmetry plane;
    mounting a third vane, substantially identical to said first vane, to said base member on the side of the first vane opposite the symmetry plane, the lower end portion of said third vane being placed parallel to and being separated in a direction perpendicular to said symmetry plane from the lower end portion of said first vane a distance substantially equal to T−t, said third vane being inclined at an angle θ with respect to the symmetry plane and being inclined toward said first vane to urge the upper end portions of said first and third vanes to deform the vanes into a pair of back-to-back concave vanes; and mounting a fourth vane, substantially identical to said first vane, to said base member on the side of said second vane opposite the symmetry plane, the lower end portion of said fourth vane being placed parallel to and being separated in a direction perpendicular to said symmetry plane from the lower end portion of said second vane a distance substantially equal to T−t, said fourth vane being inclined at an angle θ with respect to the symmetry plane and towards said second vane to urge the upper end portions of said fourth and second vanes against one another to deform the vanes into a pair of back-to-back concave vanes, the facing surfaces of said first and second vanes forming said trough-like radiant energy collector with the upper end portions thereof defining the entrance apertures and the lower end portion thereof defining the exit aperture.

12. The method of claim 11 in which the distance between the upper and the lower end portion of the vanes is selected so that said entrance and exit apertures are separated a distance L.

13. The method of claim 12 further comprising the steps of mounting additional vanes, such as said first and third vane, on said base member to form additional pairs of back-to-back concave vanes with reflective exterior surfaces, each pair of concave vanes being separate from each additional pair of concave vanes by a distance substantially equal to t with each pair of opposed reflective surfaces forming an additional trough-like radiant energy collector.

14. The method of constructing a nonimaging, radiant energy collector consisting of a plurality of trough-like collector elements comprising the steps of:

mounting a pair of substantially identical, flexible and deformable planar vanes, having at least one reflective surface, back-to-back on a common base member with the reflective surfaces facing outwards and with the lower end portions of said vanes being separated a first predetermined distance and the upper end portions being urged against one another to deform said vanes into a first pair of concave vanes;

mounting additional vanes on additional base members to form additional pairs of concave vanes substantially identical to said first pair of concave vanes, the additional pairs being mounted parallel to and being separated from one another so that the upper end portions are separated a second predetermined distance, the facing vanes of adjacently mounted pairs of concave vanes forming a collector element.

15. The method of claim 14 in which the lower end portion of the vanes forming a pair of concave vanes are each inclined at a predetermined angle with respect to the plane of symmetry of the collector element.

16. The method of claim 15 in which said predetermined angle is selected to be equal to the collector angle of a collector element at the exit aperture.

17. The method of claim 15 in which the first predetermined distance is selected to be substantially equal to the difference between the width of the entrance and exit apertures of the collector elements.

18. The method of claim 17 in which the second predetermined distance is selected to be substantially equal to the width of the entrance aperture.

19. A collector in accordance with claim 1 in which said vanes are substantially identical with the exception of the separation between the lower and the upper end portions, and the separation between the lower and the upper end portions being selected so that the upper end portions of a pair of vanes are contiguous.

* * * * *